US007915360B2

(12) United States Patent
Hong et al.

(10) Patent No.: US 7,915,360 B2
(45) Date of Patent: Mar. 29, 2011

(54) SUPPORTED CATALYST FOR OLEFIN POLYMERIZATION USING TRANSITION METAL COMPOUND HAVING PHENYLENE-BRIDGE, METHOD FOR PREPARING THE SAME, AND METHOD FOR PREPARING POLYOLEFIN USING THE SAME

(75) Inventors: Dae-Sik Hong, Gunpo-si (KR); Ki-Soo Lee, Daejeon Metropolitan (KR); Yong-Gyu Han, Daejeon Metropolitan (KR); Heon-Yong Kwon, Daejeon Metropolitan (KR); Jong-Sang Park, Daejeon Metropolitan (KR); Joon-Hee Cho, Daejeon Metropolitan (KR); Seon-Kyoung Kim, Daejeon Metropolitan (KR); Choong-Hoon Lee, Daejeon Metropolitan (KR); Eun-Jung Lee, Daejeon Metropolitan (KR); Seung-Whan Jung, Suwon-si (KR); Ki-Su Ro, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 38 days.

(21) Appl. No.: 12/312,823

(22) PCT Filed: Nov. 15, 2007

(86) PCT No.: PCT/KR2007/005727
§ 371 (c)(1),
(2), (4) Date: May 28, 2007

(87) PCT Pub. No.: WO2008/066266
PCT Pub. Date: Jun. 5, 2008

(65) Prior Publication Data
US 2010/0093959 A1 Apr. 15, 2010

(30) Foreign Application Priority Data

Dec. 1, 2006 (KR) ........................ 10-2006-0120633

(51) Int. Cl.
*C08F 4/6592* (2006.01)
*C08F 4/642* (2006.01)
*B01J 31/22* (2006.01)

(52) U.S. Cl. ........ 526/161; 526/129; 526/160; 526/165; 526/943; 502/103; 502/104; 502/120; 502/152; 502/155

(58) Field of Classification Search .................. 502/103, 502/104, 120, 152, 155; 526/129, 160, 161, 526/165, 943
See application file for complete search history.

(56) References Cited

U.S. PATENT DOCUMENTS

| 6,037,296 | A | * | 3/2000 | Hsieh et al. | .................... | 502/113 |
| 6,548,686 | B2 | | 4/2003 | Nabika et al. | | |
| 6,812,303 | B1 | * | 11/2004 | Matsushita et al. | ........... | 526/133 |
| 2007/0225158 | A1 | | 9/2007 | Lee et al. | | |

FOREIGN PATENT DOCUMENTS

KR 10-2006-0091528 A 8/2006

OTHER PUBLICATIONS

Dae Joon Cho, et al., "o-Phenylene-Brided Cp/Amido Titanium Complexes for Ethylene/1-Hexene Coplymerizations", Organometallics 2006, vol. 25, pp. 2133-2134.
Markus Enders, et al., "Synthesis of Main Group and Transition Metal Complexes with the (8-Quinolyl) cyclopentadienyl Ligand and Their Application in the Polymerization of Ethylene", Organometallics 2004, vol. 23, pp. 3832-3839.
Markus Enders, et al., "Chirale Titan- und Zirkoniumkomplexe mit dem 1-(8-Chinolyl)-2,3-dimethylcylopentadienyl-Ligand", Journal of Organometallics Chemistry 549, 1977, pp. 251-256.
Vernon C. Gibson, et al., "Advances in Non-Metallocene Olefin Polymerization Catalysis", Chem. Rev. 2003, vol. 103, pp. 283-315.
You-Xian Chen, et al., "'Constrained Geometry' Catalyst System. Efficient Synthesis, Structural Characterization, and α-Olefin Polymerization Catalysis", Organometallics 1997, vol. 16, pp. 5958-5963.
Yuetao Zhang, et al., "Tetramethylcyclopentadienyl-phenoxytitanium Dichlorides: Template Synthesis, Structures, and Catalytic Properties for Ethylene Polymerization", Organometallics 2004, vol. 23, pp. 540-546.
Luke E. Turner, et al., "Facile Resolution of Contrained Geometry Indenyl-phenoxide Ligation", Chem. Communication, 2003, pp. 1034-1035.
Steven D.R. Christie, et al., "Novel Routes to Bidentate Cyclopentadienyl-Alkoxide Complexes of Tatanium: Synthesis of $(\eta^5\text{-}\sigma\text{-}C_5R^1{}_x CHR^2CH_2CR^3R^4O) TiCl_2$", Organometallics 1999, vol. 18, pp. 348-359.
Ester E.C.G. Gielens, et al., "Titanium Hydrocarbyl Complexes with a Linked Cyclopentadienyl-Alkoxide Ancillary Ligand; Participation of the Ligand in an Unusual Activation of a (Trimethylsilyl) methyl Group", Organometallics1998, vol. 17, pp. 1652-1654.

(Continued)

*Primary Examiner* — Caixia Lu
(74) *Attorney, Agent, or Firm* — McKenna Long & Aldridge

(57) ABSTRACT

The present invention provides a new supported catalyst for olefin polymerization prepared by reacting a novel transition metal compound on a cocatalyst-supported support, in which the transition metal compound is coordinated with a mono-cyclopentadienyl ligand to which an amido-quinoline group is introduced, a method for preparing the same, and a method for preparing a polyolefin using the same. The transition metal catalyst compound used in the present invention is configured such that an amido group is linked in a cyclic form via a phenylene bridge. Thus, a pentagon ring structure of the transition metal compound is stably maintained, so that monomers easily approach the transition metal compound and the reactivity is also high. Accordingly, if the supported catalyst for olefin polymerization prepared according to the present invention is applied to the copolymerization of ethylene and monomers having large steric hindrance in a slurry or a gas phase process, a linear, a linear, high molecular weight polyolefin having a very low density of 0.900 to 0.970 g/cc or less can be obtained.

16 Claims, No Drawings

OTHER PUBLICATIONS

Alexander Rau, et al., "Synthesis and Application in High-Pressure Polymerization of a Titanium Complex With a Linked Cyclopentadienyl-Phenoxide Ligand", Journal of Organometallic Chemistry, 2000, vol. 608, pp. 71-75.

Kittichote Musikabhumma, et al., "Synthesis of Branched Polyethylenes by the Tandem Catalysis of Silica-Supported Linked Cyclopentadienyl-Amido Titanium Catalysts and a Homogeneous Dibromo Nickel Catalyst Having Pyridylimine Ligand", Journal of Polymer Science: Part A: Polymer Chemistry, 2003, vol. 41, pp. 528-544.

Rajeswari M. Kasi, et al., "Supported Constrained-Geometry Catalysts on Cross-Linked (Aminomethyl) Polystyrene: Studies of Ethylene and 1-Octene Polymerizations", Organometallics 2003, ol. 22, pp. 1534-1539.

Griselda Barrera Galland, et al., "Ethylene Homo- and Copolymerization Using ($n$BuCp)$_2$ Grafted on Silica Modified with Different Spacers", Journal of Molecular Catalysis A: Chemical 210, 2004, pp. 149-156.

* cited by examiner

SUPPORTED CATALYST FOR OLEFIN POLYMERIZATION USING TRANSITION METAL COMPOUND HAVING PHENYLENE-BRIDGE, METHOD FOR PREPARING THE SAME, AND METHOD FOR PREPARING POLYOLEFIN USING THE SAME

This application claims the benefit of International PCT/KR2007/005727 filed Nov. 15, 2007 along with Korean Application No. 10-2006-0120633, filed on Dec. 1, 2006, both of which are hereby incorporated by reference for all purposes as if fully set forth herein.

TECHNICAL FIELD

The present invention relates to a supported catalyst for olefin polymerization, a method for preparing the same, and a method for preparing a linear polyolefin having a high molecular weight and low density using the supported catalyst for olefin polymerization.

This application claims priority from Korean Patent Application No. 10-2006-0120633 filed on Dec. 1, 2006 in the KIPO, the disclosure of which is incorporated herein by reference in its entirety.

BACKGROUND ART

Preparation of polyolefin and its application have been remarkably developed with the aid of a catalyst, so-called Ziegler-Natta catalyst, and its production process and uses have been also developed. In particular, much of the focus has been placed on developing polyolefin products using a variety of single-site catalyst in the related art, in addition to the enhanced activity of Ziegler-Natta catalysts. As the single-site catalysts, metallocene catalysts, constrained-geometry-catalyst (CGC) from Dow, and catalysts using late transition metals are usually used.

CGC shows excellent properties in a copolymerization reaction of ethylene and alpha-olefin, compared to conventional metallocene catalysts, which can be summarized as follows.

First, CGC can be used to form high molecular weight polymers due to its high reactivity at high polymerization temperature, and second, CGC can be used for copolymerization of alpha-olefin having large steric hindrance, such as 1-hexene and 1-octene. In addition to these properties described above, due to many useful properties obtained from use of CGC, studies on synthesis of CGC derivatives as a polymerization catalyst have been substantially conducted in academic and industrial fields.

For example, synthesis of metal compounds comprising other various bridges instead of a silicon bridged CGC and a nitrogen substituent, and polymerization using these metal compounds have been tried to be performed. Examples of such metal compounds include Compounds (1) to (4) (Chem. Rev. 2003, 103, 283).

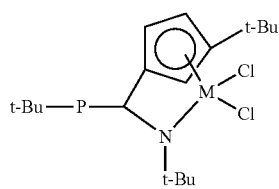

(1)

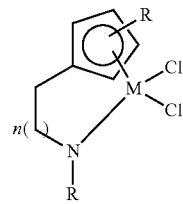

(2)

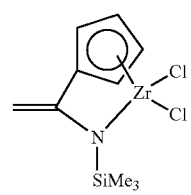

(3)

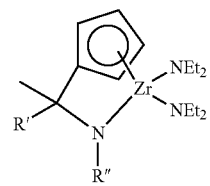

(4)

Compounds (1) to (4) contain a phosphorus bridge (1), an ethylene or propylene bridge (2), a methyllidene bridge (3), and a methylene bridge (4), respectively, instead of the silicon bridge of the CGC structure. However, these compounds show low activity or poor copolymerization performance, when ethylene is polymerized or when ethylene and alpha-olefin are copolymerized, as compared to CGC.

In addition, the amido ligand in CGC can be replaced with an oxido ligand. Some of such compounds were used for polymerization. Examples of such compounds include:

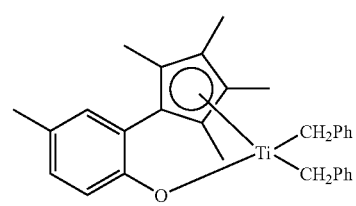

(5)

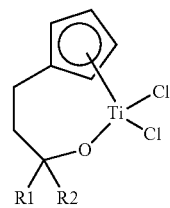

(6)

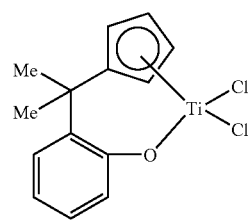

(7)

-continued

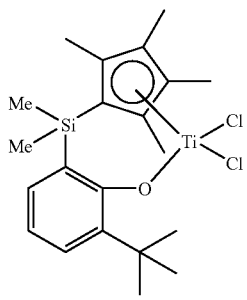

(8)

In Compound (5), which was developed by T. J. Marks et al., a cyclopentadiene Cp) derivative is bridged to an oxido ligand by ortho-penylene group (Organometallics 1997, 16, 5958). A compound having the same bridge as in Compound (5) and the polymerization using the compound were suggested by Mu et al. (Organometallics 2004, 23, 540). Further, a compound in which an indenyl ligand is bridged to an oxido ligand by an ortho-phenylene group was developed by Rothwell et al. (Chem. Commun. 2003, 1034). In Compound (6), which was developed by Whitby et al., a cyclopentadienyl ligand is bridged to an oxido ligand by three carbon atoms (Organometallics 1999, 18, 348). It was reported that Compound (6) showed reactivity in syndiotactic polystylene polymerization. Similar compounds to Compound (6) were developed by Hessen et al. (Organometallics 1998, 17, 1652). Compound (7), which was developed by Rau et al., showed reactivity when being used for ethylene polymerization and ethylene/1-hexene copolymerization at high temperature and high pressure (210° C., 150 Mpa) (J. Organomet. Chem. 2000, 608, 71). Compound (8), which has a similar structure to Compound (7), can be used for high temperature, high pressure polymerization, which was applied to US Patent Office by Sumitomo Co. (U.S. Pat. No. 6,548,686).

It was reported that a supported catalyst was synthesized and supported in the CGC form by linkage structure on a silica surface (J. Mol. Catal. A 2004, 210, 149, J. Polym. Sci. Part A: Polym. Chem. 2003, 41, 528). It was reported that the CGC catalyst was immobilized using polystyrene having an aminomethyl group as a support (Organometallics 2003, 22, 1534). However, when the catalyst is produced by such methods, a desired group has to be first linked to a support, and then all reactions have to be performed on the support. Therefore, the reaction process becomes complicated, and requires more time. Accordingly, it is difficult to apply the catalysts in commercial plant.

DISCLOSURE OF INVENTION

Technical Problem

Accordingly, it is an object of the present invention to provide a novel supported catalyst for olefin polymerization using a transition metal compound having a phenylene bridge, a method for preparing the same, and a method for preparing a linear polyolefin having a high molecular weight and low density using the supported catalyst for olefin polymerization with high activity.

Technical Solution

In order to achieve the object, one embodiment of the present invention provides a supported catalyst for olefin polymerization, comprising a support a); a cocatalyst b); and a transition metal catalyst compound of the following Formula 1 c).

[Formula 1]

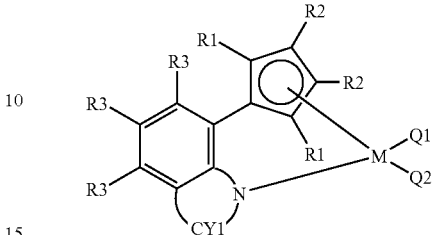

wherein R1 and R2 may be the same or different from each other, and each independently hydrogen; an alkyl radical having 1 to 20 carbon atoms; an alkenyl radical having 2 to 20 carbon atoms; an aryl radical having 6 to 20 carbon atoms; a silyl radical; an alkylaryl radical having 7 to 20 carbon atoms; an arylalkyl radical having 7 to 20 carbon atoms; or a metalloid radical of Group 4 metal substituted with hydrocarbyl; wherein R1 and R2, or two R2s may be connected by an alkylidine radical that contains an alkyl radical having 1 to 20 carbon atoms or aryl radical having 6 to 20 carbon atoms to form a ring;

R3s may be the same or different from each other, and each independently hydrogen; a halogen radical; an alkyl radical having 1 to 20 carbon atoms; an aryl radical having 6 to 20 carbon atoms; an alkoxy radical having 1 to 20 carbon atoms; an aryloxy radical having 6 to 20 carbon atoms; or an amido-radical; wherein two or more of R3s may be connected to each other to form an aliphatic or aromatic ring;

CY1 is a substituted or unsubstituted, aliphatic or aromatic ring, and CY1 may be substituted with halogen radical; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or an amido radical, in the case where CY1 is substituted with plural substituents, two or more of the substituents may be connected to each other to form an aliphatic or aromatic ring;

M is a transition metal of Group 4; and

Q1 and Q2 may be the same or different from each other, and each independently a halogen radical; an alkyl radical having 1 to 20 carbon atoms; an alkenyl radical having 2 to 20 carbon atoms; an aryl radical having 6 to 20 carbon atoms; an alkylaiyl radical having 7 to 20 carbon atoms; an arylalkyl radical having 7 to 20 carbon atoms; an alkyl amido radical having 1 to 20 carbon atoms; an aryl amido radical having 6 to 20 carbon atoms; or an alkylidene radical having 1 to 20 carbon atoms.

Another embodiment of the present invention provides a method for preparing a supported catalyst for olefin polymerization, comprising the steps of i) reacting a cocatalyst on a support to prepare a support supported with the cocatalyst; and ii) supporting a transition metal catalyst compound of Formula 1 on the support supported with the cocatalyst.

Still another embodiment of the present invention provides a method for preparing a polyolefin, comprising the step of polymerizing olefinic monomers under the presence of the supported catalyst for olefin polymerization according to the present invention.

ADVANTAGEOUS EFFECTS

A supported catalyst for olefin polymerization according to the present invention is configured such that an amido group is linked in a cyclic form via a phenylene bridge of the used precatalyst. Thus, a pentagon ring structure of the transition metal compound is stably maintained, so that a sterically hindered alpha-olefin easily approaches the transition metal compound and the reactivity is also high.

Further, the supported catalyst for olefin polymerization according to the present invention has much higher activity than the known catalysts.

Moreover, if the supported catalyst for olefin polymerization according to the present invention is applied to the copolymerization of ethylene and alpha-olefin in a slurry or a gas phase process, a linear, high molecular weight polyolefin having a very low density of 0.900 to 0.970 g/cc or less can be obtained.

BEST MODE FOR CARRYING OUT THE INVENTION

Hereinafter, the present invention will be described in detail.

As one embodiment of the present invention, a supported catalyst for olefin polymerization comprises a support a); a cocatalyst b); and a transition metal catalyst compound of Formula 1 c).

The above substituents of Formula 1 will be described in detail as follows.

The "hydrocarbyl" is a monovalent group produced by the removal of a hydrogen atom from a hydrocarbon molecule, and includes ethyl, phenyl or the like.

The "metalloid" is a semimetal, which is an element having properties of both metal and nonmetal, and includes arsenic, boron, silicon, tellurium or the like.

The transition metal catalyst compound c) of Formula 1 is a transition metal catalyst compound having the structure corresponding to the following Formula 2 or 3, which is preferred to control electronic, steric environments in the vicinity of metal.

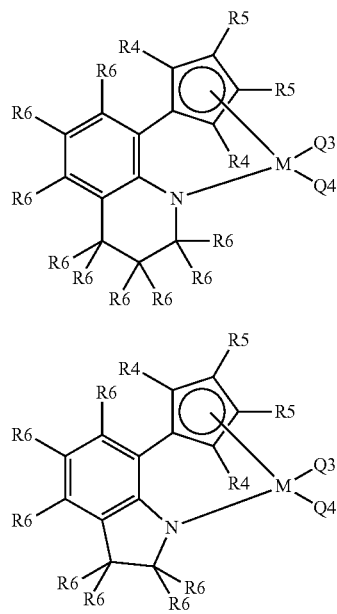

[Formula 2]

[Formula 3]

wherein R4 and R5 may be the same or different from each other, and each independently hydrogen; an alkyl radical having 1 to 20 carbon atoms; an aryl radical having 6 to 20 carbon atoms; or a silyl radical;

R6s may be the same or different from each other, and each independently hydrogen; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or an amido radical; wherein two or more of R6s may be connected to each other to form a aliphatic or aromatic ring;

Q3 and Q4 may be the same or different from each other, and each independently a halogen radical; an alkyl radical having 1 to 20 carbon atoms; an alkyl amido radical having 1 to 20 carbon atoms; or an aryl amido radical having 6 to 20 carbon atoms; and M is a transition metal of Group 4.

In Formula 1, more preferred compounds to control electronic, steric environments in the vicinity of metal are transition metal catalyst compounds having the following structures.

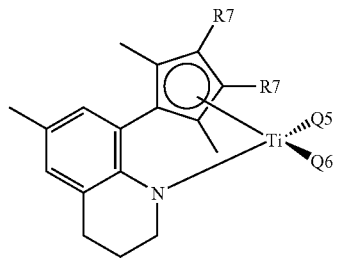

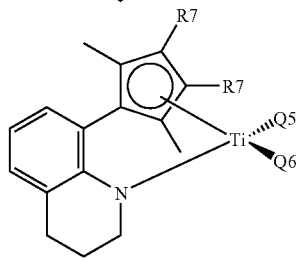

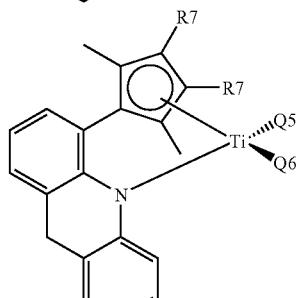

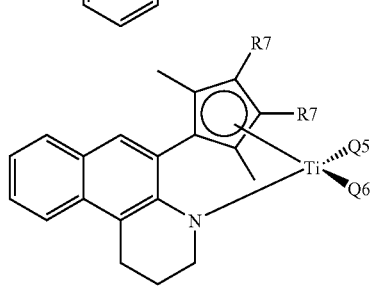

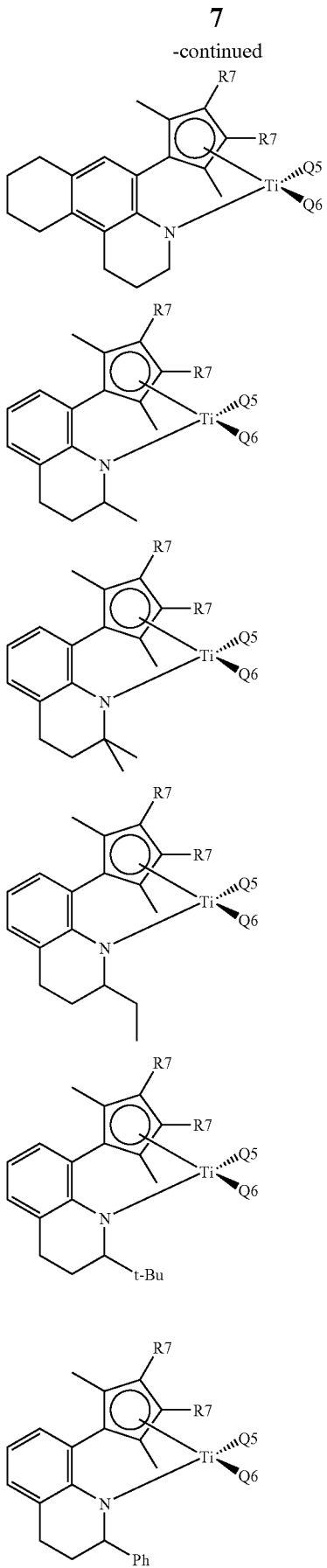

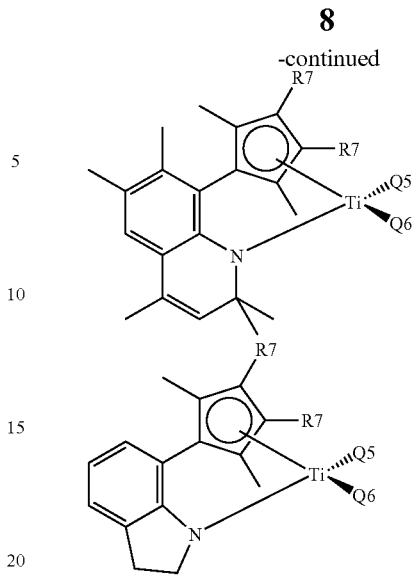

wherein R7s may be the same or different from each other, and each independently selected from hydrogen and a methyl radical, and Q5 and Q6 may be the same or different from each other, and each independently selected from a methyl radical, a dimethylamido radical, and a chloride radical.

In the transition metal compound of Formula 1, the metal position is connected by a cyclopentadienyl ligand, to which an amido group is introduced in a cyclic form via a phenylene bridge, and thus there is tendency that structurally the Cp-M-N angle keeps narrow, while the Q1-M-Q2 angle for approach of the monomers keeps wide. Further, to be contrary with the CGC structure having a linkage via a silicon bridge, for example, the compound structure represented by Formula 1 has a stable and rigid pentagon ring structure having metal positions with a Cp, a phenylene bridge, and a nitrogen atom due to the cyclic form. That is, the nitrogen atom of the amido group is connected with the phenylene bridge by two bonds in a cyclic form, so that the complex has a more rigid structure. Thus, it is possible that these transition metal compounds are reacted with a cocatalyst such as methylaluminoxane for activation, and then used in the olefin polymerization, and it is also possible that even at a high polymerization temperature, a polyolefin having the characteristics such as high activity, high molecular weight, and high copolymerizability is produced.

Further, various substituents can be introduced to the cyclopentadienyl ring and the quinoline ring, wherein the electronic or steric environment surrounding the metal can be easily regulated according to the kinds of the introduced substituents, and thus the structure and the physical properties of the resulting polyolefin can be controlled.

As the support a), a support containing a hydroxyl group on its surface can be used, and preferably, a support containing a reactive hydroxyl group and siloxane group, on which the surface is dried without moisture, can be used.

For example, silica, silica-alumina, and silica-magnesia that are dried at high temperature can be used, and may usually contain oxides, carbonates, sulfates, and nitrates such as $Na_2O$, $K_2CO_3$, $BaSO_4$, $Mg(NO_3)_2$, or the like.

The support is preferably dried at 200 to 800° C., more preferably 300 to 600° C., most preferably 300 to 400° C. If the drying temperature is less than 200° C., much moisture on its surface may be reacted with the cocatalyst. If the drying temperature is more than 800° C., pores on the support surface are combined with each other to reduce surface area, the hydroxyl groups are removed and only the siloxane groups remain on the surface. Thus, the reactive sites with cocatalyst are reduced.

An amount of hydroxyl group on the surface of support a) is preferably 0.1 to 10 mmol/g, and more preferably 0.5 to 1 mmol/g. The amount of hydroxyl group on the surface of support a) can be controlled depending on the preparation method of the support and its conditions, or drying conditions such as temperature, time, vacuum, and spray drying.

If the amount of hydroxyl group is less than 0.1 mmol/g, the reactive sites with cocatalyst are reduced. If the amount of hydroxyl group is more than 10 mmol/g, the hydroxyl groups may come from moisture, in addition to hydroxyl groups being present on the particle surface of support, which is not preferable.

It is preferable that the cocatalyst b) is a metal compound containing a Group 13 metal of the Periodic Table. As the cocatalyst b), cocatalysts that are generally used for olefin polymerization in the presence of metallocene catalyst can be used. If the cocatalyst is supported on the above described support, a bond between the hydroxyl group on the support and Group 13 metal occurs.

Specifically, the cocatalyst b) is preferably a compound represented by the following Formula 4.

$$-[Al(R8)-O]_a-$$ [Formula 4]

wherein R8s may be the same or different from each other, and each independently a halogen radical; a hydrocarbyl radical having 1 to 20 carbon atoms; or a hydrocarbyl radical having 1 to 20 carbon atoms that is substituted with halogen; and a is an integer of 2 or more.

In this connection, the compound represented by Formula 4 may have a linear, circular or network structure. Examples of the compound include methylaluminoxane (MAO), ethylaluminoxane, isobutylaluminoxane, and butylaluminoxane, and preferably methylaluminoxane.

On the other hand, the ratio of [transition metal]/[support] in the supported metallocene catalyst is preferably 1 to 30 mol of transition metal per g of support, and the weight ratio of [Group 13 metal]/[support] is preferably 0.01 to 0.4.

Further, the molar ratio of [Group 13 metal]/[transition metal] in the supported metallocene catalyst is preferably 1 to 10,000, more preferably 1 to 1,000, and most preferably 10 to 100. If the molar ratio is less than 1, the content of Group 13 metal such as Al is too low, so that catalyst active species are not formed, and the activity is very low. If the molar ratio is more than 10,000, a cocatalyst such as methylaluminoxane (MAO) may act as catalytic poisons.

As another embodiment of the present invention, a method for preparing a supported catalyst for olefin polymerization comprises the steps of i) reacting a cocatalyst on a support to prepare a support supported with the cocatalyst; and ii) supporting a transition metal catalyst compound of Formula 1 on the support supported with the cocatalyst.

The support and cocatalyst used in the step i) are the same as mentioned in the description of the supported catalyst for olefin polymerization according to the present invention, and the transition metal catalyst compound of Formula 1 used in the step ii) are the same as mentioned in the description of the supported catalyst for olefin polymerization according to the present invention.

In at least one step of the steps i) and ii), hydrocarbon solvents or aromatic solvents can be used. In this connection, examples of the reaction solvent used for preparation of the supported catalyst for olefin polymerization include, but are not limited to, hydrocarbon solvents such as pentane, hexane and heptane, or aromatic solvents such as benzene and toluene, and all reaction solvents known in the related art can be used.

In the step i), the support is well dispersed in the reaction solvent, and then the cocatalyst is added thereto, which is advantageous to be slowly carried out. The cocatalyst and the support are preferably reacted at a temperature of room temperature to 120° C., and the reaction can be performed for several minutes to several hours.

In the step ii), the step of supporting a transition metal catalyst compound of Formula 1 on the support supported with the cocatalyst can be performed as described above. That is, it is advantageous to slowly perform the addition of transition metal catalyst compound of Formula 1, and the reaction temperature is preferably from room temperature to 120° C. Further, the reaction can be performed for several minutes to several hours.

As still another embodiment of the present invention, the method for preparing a polyolefin comprises the step of polymerizing olefinic monomers in the presence of the supported catalyst for olefin polymerization according to the present invention.

In the method for preparing a polyolefin according to the present invention, the supported catalyst for olefin polymerization can be used for polymerization of olefinic monomers without any treatment. Also, it can be prepared into a pre-polymerized catalyst by contacting the catalyst with an olefinic monomer such as ethylene, propylene, 1-butene, 1-hexene, and 1-octene.

Examples of an olefinic monomer that can be polymerized using the supported catalyst for olefin polymerization may include ethylene, alpha-olefin, cyclic olefin, and diene or triene olefin having at least two double bonds.

Specific example of the olefinic monomer include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicocene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene, and two or more of monomers may be mixed to be copolymerized.

In the presence of the supported catalyst for olefin polymerization, the step of polymerizing olefinic monomers is preferably performed at 50 to 150° C.

For the olefin polymerization process using the supported catalyst for olefin polymerization, a slurry process, a gas phase process, or a combination of slurry and gas phase processes can be applied. A slurry process or a gas phase process is preferable.

In the method for preparing a polyolefin according to the present invention, the supported catalyst for olefin polymerization can be used after being dissolved or diluted using an aliphatic hydrocarbon solvent having 5 to 12 carbon atoms such as pentane, hexane, heptane, nonane, decane and isomers thereof, an aromatic hydrocarbon solvent such as toluene and benzene, or a hydrocarbon solvent substituted with a chlorine atom such as dichloromethane and chlorobenzene. Preferably, the solvent is treated with a trace amount of alkyl aluminum to remove catalytic poisons like water, air, or the like, and a cocatalyst can be further used.

The polyolefin polymerized by the preparation method according to the present invention may have a density of 0.900 to 0.970 g/cc, and a melt index (MI) of 0.01 to 100.

MODE FOR THE INVENTION

Hereinafter, the present invention will be described in more detail with reference to preferred Examples. However, these Examples are for the illustrative purpose only, and the present invention is not intended to be limited by these Examples.

Organic reagents and solvents for catalyst preparation and polymerization were purchased from Aldrich and purified by the standard methods. Ethylene (high purity) was purchased from Applied Gas Technology and filtered to remove moisture and oxygen before polymerization. Catalyst preparation, supporting and polymerization were carried out in the absence of air and moisture to ensure reproducibility.

A 300 MHz NMR (Bruker) spectrum was obtained to identify the catalyst structure. The molecular weight and molecular weight distribution were determined from the GPC (gel permeation chromatography) analysis using Waters' 150CV+. The analysis temperature was 140° C. Trichlorobenzene was used as a solvent, and the number-average molecular weight (Mn) and weight-average molecular weight (Mw) were determined after standardizing with polystyrene. Further, the molecular weight distribution (polydispersity index, PDI) was calculated by dividing the weight-average molecular weight by the number-average molecular weight.

The melt index (MI) of polymer was determined by ASTM D-1238.

The supported catalyst was analyzed using an ICP-AES (Inductively Coupled Plasma-Atomic Emission Spectrometer), XMP integra, manufactured by GBC). From the ICP analysis, the supported catalyst and the content of titanium and aluminum in the filtrate can be measured.

Preparation Example 1

[(6-methyl-1,2,3,4-tetrahydroquinolin-8-yl)trimethylcyclopentadienyl-$\eta^5$,κ-N]titanium dichloride compound 6-methyl-1,2,3,4-tetrahydroquinoline (1.16 g, 7.90 mmol) was dissolved in carbon tetrachloride (4 mL), and cooled to −20° C. Solid N-bromosuccinimide (1.41 g, 7.90 mml) was slowly added thereto, the reaction temperature was raised to room temperature, and further reacted for 5 hours. The obtained compound was purified by column chromatography using an MC and hexane (v:v=1:1) solvent, and light yellow oil was obtained (0.71 g, 40%).

Degassed DME (dimethylether) (21 mL) and distilled water (7 mL) were added to the mixture of 2,3-dimethyl-5-oxocyclopent-1-enylboronic acid (1.27 g, 8.26 mmol), $Na_2CO_3$ (1.25 g, 11.8 mmol), $Pd(PPh_3)_4$ (0.182 g, 0.157 mmol), and the prepared 8-bromo-1,2,3,4-tetrahydro-6-methylquinoline (7.87 mmol), and heated at 95° C. overnight. The reaction solution was cooled to room temperature, and extracted from an ethylacetate solvent (50 mL) twice. The obtained compound was purified by column chromatography using a hexane and ethylacetate (2:1) solvent, and a light yellow solid was obtained (90%).

Anhydrous $La(OTf)_3$ (21.4 mmol) and THF (24 mL) solution were cooled to −78° C. Then, MeLi (13.4 mL, 21.4 mmol) was added thereto, and reacted for 1 hour. The prepared 5-(3,4-dimethyl-2-cyclopenten-1-on)-7-methyl-1,2,3,4-tetrahydroquinoline (7.13 mmol) compound was added thereto, reacted at −78° C. for 2 hours, and extracted using water and an acetate solvent. The obtained organic layer was shaken with HCl (2 N, 20 mL) for 2 minutes, and neutralized with aqueous $NaHCO_3$ (20 mL) to be dried with $MgSO_4$. The obtained compound was purified by column chromatography using a hexane and ethylacetate (10:1) solvent, and a light yellow solid was obtained (40%).

The obtained 1,2,3,4-tetrahydro-6-methyl-8-(2,3,5-trimethylcyclopenta-1,3-dienyl) quinoline ligand (0.696 mmol) and $Ti(NMe_2)_4$ compound (0.156 g, 0.696 mmol) were dissolved in toluene (2 mL), and then reacted at 80° C. for 2 days. Then, all solvents were removed to obtain a red solid compound (100%).

Toluene (2 mL) was further added to the obtained red solid compound. Then, $Me_2SiCl_2$ (0.269 g, 2.09 mmol) was added thereto at room temperature, and reacted for 4 hours. The obtained compound was recrystallized in the presence of hexane at −30° C. to obtain a pure red solid (0.183 g, 66%).

$^1$H NMR ($C_6D_6$): δ 1.36-1.44 (m, 2H, $CH_2CH_2CH_2$), 1.76 (s, 3H, $CH_3$), 1.85 (s, 3H, CH), 2.07 (s, 3H, $CH_3$), 2.18 (s, 3H, $CH_3$), 2.12 (t, J=4 Hz, 2H, CH), 4.50-4.70 (m, 2H, N—CH), 6.02 (s, 1H, Cp-H), 6.59 (s, 1H, $C_6H_2$), 6.78 (s, 1H, $C_6H_2$) ppm.

$^{13}$C{$^1$H} NMR($C_6D_6$): δ 12.76, 14.87, 15.06, 21.14, 22.39, 26.32, 54.18, 117.49, 120.40, 126.98, 129.53, 130.96, 131.05, 133.19, 143.22, 143.60, 160.82 ppm.

Anal. Calc. ($C_{18}H_{21}Cl_2NTi$): C, 58.41; H, 5.72; N, 3.78%. Found: C, 58.19; H, 5.93; N, 3.89%.

Preparation Example 2

[(1,2,3,4-tetrahydroquinolin-8-yl)tetramethylcyclopentadienyl-$\eta^5$,κ-N]titanium dimethyl compound 1,2,3,4-tetrahydroquinoline (957 mg, 7.185 mmol) was dissolved in THF (10 ml), and then stirred at −78° C. for 30 minutes. Then, n-BuLi (2.87 ml, 7.185 mmol) was injected with a syringe under nitrogen atmosphere [yellow suspension]. After the solution was sufficiently stirred for 3 hours, and degassed at −20° C. Then, the solution was cooled to −78° C., and $CO_2$ gas was injected thereto (its color changed to white close to transparency). The temperature was raised to −20° C., then the remaining $CO_2$ gas was removed under vacuum for 1 hour, and tert-BuLi (5.07 ml, 8.622 mmol) was added thereto (its color changed to red). While the temperature was maintained at −20° C., and the solution was sufficiently stirred for 2 hours. Then, a 0.33 M $CeCl_3.2LiCl$ solution (26.1 ml, 8.622 mmol) dissolved in THF and tetramethyl cyclopentenone (1.182 g, 8.622 mmol) were introduced under nitrogen atmosphere. The temperature was slowly raised to room temperature, and the reaction was terminated. The solvent was removed, and titration was performed with pentane under nitrogen atmosphere. The resultant was filtered to obtain a white crystalline powder (41%).

n-BuLi (220 mg, 0.792 mmol, 2.5 M) was slowly added to a cold ether solution (−30° C.) of the prepared compound (100 mg, 0.396 mmol) under stirring. The temperature was raised to room temperature, and reacted for 6 hours. The solution was filtered, washed with ether several times, and ether was removed under vacuum to obtain a light yellow solid (90 mg).

$TiCl_4$.DME (66 mg, 0.235 mmol) was added to ether (−30° C.), and placed in a refrigerator for 1 hour. After 1 hour, the solution was taken out of the refrigerator, and MeLi (0.3 ml, 0.470 mmol, 1.4 M) was slowly added thereto under stirring. After stirring for 15 minutes, prepared lithium salt (70 mg, 0.235 mmol) was added, and reacted under stirring at room temperature for 3 hours. The solvent was removed under vacuum, and the resultant was dissolved in pentane to be filtered. Those dissolved in pentane were under vacuum to remove pentane. As a result, a deep brown titanium complex (52 mg) was obtained (67%).

$^1$H NMR ($C_6D_6$): δ 7.00 (d, J=7.6 Hz, 1H), 9.92 (d, J=7.6 Hz, 1H), 6.83 (t, J=7.6 Hz, 1H), 4.53 (m, 2H), 2.47 (t, J=6.4 Hz, 2H), 2.05 (s, 6H), 1.66 (s, 6H), 1.76-1.65 (m, 2H), 0.58 (s, 6H).

Examples 1 to 3

Preparation of Supported Catalyst for Olefin Polymerization

Example 1

(Drying of Support)

Sylopol 948 silica (manufactured by Grace-Davison) was dehydrated and dried under vacuum at 400° C. for 12 hours.

(Preparation of Cocatalyst-supported Support)

10 g of the dried silica was put in a glass reactor, and a methylaluminoxane (MAO) solution containing 16 mmol of aluminum in a toluene solution was added thereto. The mixture was slowly reacted under stirring at 40° C. for 1 hour. The unreacted aluminum compound was removed by washing a sufficient amount of toluene. Then, the remaining toluene was removed under reduced pressure at 50° C. As a result, 15 g of cocatalyst-supported support was prepared, and the obtained MAO/$SiO_2$ was found to contain 16.7% Al.

(Preparation of Supported Catalyst for Olefin Polymerization)

In order to prepare a supported catalyst for olefin polymerization, 1.5 g of the cocatalyst-supported support was put in a glass reactor, and then 10 ml of toluene was added thereto to be stirred. A toluene solution containing 100 μmol (based on Ti) of the transition metal catalyst compound having a phenylene bridge that was prepared in Preparation Example 1 was added to the glass reactor containing the supports, and then reacted under stirring at 40° C. for 1 hour. Then, the resultant was washed with a sufficient amount of toluene, and dried under vacuum to obtain a solid powder. From ICP analysis of the prepared supported catalyst for olefin polymerization, it was found that [Ti] was 0.3 wt %, [Al] was 16.2 wt % and the molar ratio of [Al]/[Ti] was 96.

Example 2

The same procedure was carried out in the same manner as in Example 1, except that the transition metal catalyst compound having a phenylene bridge prepared in Preparation Example 2 was used instead of the transition metal catalyst compound having a phenylene bridge prepared in Preparation Example 1.

Example 3

(Preparation of Mixed Supported Catalyst)

In order to prepare a supported catalyst for olefin polymerization, 1.5 g of the cocatalyst-supported support was put in a glass reactor, and then 10 ml of toluene was added thereto to be stirred. A mixed supported catalyst for olefin polymerization was prepared in the same manner as in Example 2, except that 50 μmol (based on Ti) of the transition metal catalyst compound having a phenylene bridge that was prepared in Preparation Example 1 was supported, and then 50 μmol (based on Ti) of the transition metal catalyst compound having a phenylene bridge that was prepared in Preparation Example 2 was reacted. From ICP analysis of the prepared supported catalyst for olefin polymerization, it was found that [Ti] was 0.3 wt %, [Al] was 16.1 wt %, which was similar to Examples 1 and 2.

Examples 4 to 20

Preparation of Polyolefin Copolymer by Batch Polymerization

Example 4

50 mg of each supported catalyst prepared in Example 1 was weighed in a dry box and put in a 50 mL glass bottle. The bottle was sealed with a rubber diaphragm and taken out of the dry box, and a catalyst was ready for injection. The polymerization was performed in a 2 L metal alloy reactor for high pressure, equipped with a mechanical stirrer and capable of temperature control.

1 L of hexane dissolving 0.6 mmol of triethylaluminum and 5 ml of 1-hexene as a comonomer were added to the reactor, and then the prepared supported catalyst was added thereto without contact with air. The polymerization was carried out for an hour at 80° C., continuously applying a gaseous ethylene monomer at a pressure of 9 Kgf/$cm^2$. The polymerization was terminated by stopping the stirring and then exhausting the unreacted ethylene. The resultant polymer was filtered through a polymerization solvent and dried in an 80° C. vacuum oven for 4 hours.

Example 5

A polyolefin copolymer was prepared in the same manner as in Example 4, except that 10 ml of 1-hexene was used.

Example 6

A polyolefin copolymer was prepared in the same manner as in Example 4, except that 20 ml of 1-hexene was used.

Example 7

A polyolefin copolymer was prepared in the same manner as in Example 4, except that 50 mg of the supported catalyst prepared in Example 2 was used.

Example 8

A polyolefin copolymer was prepared in the same manner as in Example 4, except that 50 mg of the supported catalyst prepared in Example 2 and 10 ml of 1-hexene were used.

Example 9

A polyolefin copolymer was prepared in the same manner as in Example 4, except that 50 mg of the supported catalyst prepared in Example 2 and 20 ml of 1-hexene were used.

Example 10

A polyolefin copolymer was prepared in the same manner as in Example 4, except that 50 mg of the supported catalyst prepared in Example 3 was used.

Example 11

A polyolefin copolymer was prepared in the same manner as in Example 4, except that 50 mg of the supported catalyst prepared in Example 3 and 10 ml of 1-hexene were used.

Example 12

A polyolefin copolymer was prepared in the same manner as in Example 4, except that 50 mg of the supported catalyst prepared in Example 3 and 20 ml of 1-hexene were used.

Comparative Example 1

A supported catalyst for olefin polymerization was prepared in the same manner as in Example 1, except that a dimethylsilyl(t-butylamido)(tetramethylcyclopentadienyl)titanium dichloride transition metal compound was used instead of the transition metal catalyst compound having a phenylene bridge prepared in Preparation Example 1. The dimethylsilyl(t-butylamido) (tetramethylcyclopentadienyl) titanium dichloride compound was purchased from Boulder Scientific company (US).

Comparative Example 2

A polyolefin copolymer was prepared in the same manner as in Example 4, except that 50 mg of the supported catalyst prepared in Comparative Example 1 was used.

Comparative Example 3

A polyolefin copolymer was prepared in the same manner as in Example 5, except that 50 mg of the supported catalyst prepared in Comparative Example 1 was used.

Comparative Example 4

A polyolefin copolymer was prepared in the same manner as in Example 6, except that 50 mg of the supported catalyst prepared in Comparative Example 1 was used.

TABLE 1

| Item | 1-Hexene (ml) | Activity (g-PE/ g-cat · hr) | Density (g/cc) | I₂ (g/10 min) | Mw (×10⁻³) | PDI |
|---|---|---|---|---|---|---|
| Example 4 | 5 | 872 | 0.930 | 2.12 | 250 | 2.4 |
| Example 5 | 10 | 1020 | 0.926 | 2.24 | 230 | 2.5 |
| Example 6 | 20 | 1346 | 0.919 | 2.10 | 216 | 2.3 |
| Example 7 | 5 | 684 | 0.930 | 2.35 | 198 | 2.6 |
| Example 8 | 10 | 875 | 0.927 | 2.83 | 185 | 2.8 |
| Example 9 | 20 | 1069 | 0.923 | 3.20 | 152 | 3.0 |
| Example 10 | 5 | 705 | 0.929 | 2.40 | 217 | 2.8 |
| Example 11 | 10 | 951 | 0.928 | 2.44 | 201 | 3.0 |
| Example 12 | 20 | 1270 | 0.922 | 2.28 | 175 | 2.8 |
| Comparative Example 2 | 5 | 360 | 0.935 | 4.20 | 130 | 3.0 |
| Comparative Example 3 | 10 | 544 | 0.931 | 5.28 | 118 | 3.5 |
| Comparative Example 4 | 20 | 350 | 0.928 | 5.43 | 82 | 3.3 |

I₂: Melt index,
Mw: weight-average molecular weight,
PDI: Polydispersity index.

In the copolymerization of ethylene/1-hexene using the supported catalysts for olefin polymerization prepared according to Examples of the present invention, there was no fouling, or sticking of polymer particles to the reactor wall or one another. Further, the weight-average molecular weight ($M_w$) could be controlled in the range of 150,000 to 250,000, and the molecular weight distribution could be maintained in the range of 2.3 to 3.0. The density of the polymer obtained by controlling the amount of 1-hexene was 0.919 to 0.930 g/cc. Therefore, a linear ethylene having a higher molecular weight and lower density could be obtained, as compared to those prepared in Comparative Examples 2 to 4, in which dimethylsilyl(t-butylamido)(tetramethylcyclopentadienyl) titanium dichloride was used.

Accordingly, the supported catalyst of the present invention shows higher copolymerization activity than those prepared in Comparative Examples, and by using the supported catalyst, a polymer having a high molecular weight and low density can be prepared, so that the polymer has many copolymer chains. That is, the supported catalyst of the present invention has very excellent activity for olefin mono-mers having large steric hindrance such as 1-hexene. Therefore, in the case of using the supported catalyst for olefin polymerization according to the present invention, a copolymer having a lower density can be prepared. Thus, even though a smaller amount of alpha-olefins is used, the prepared copolymer has a density being similar to that of the copolymer prepared using the known catalysts.

The invention claimed is:
1. A method for preparing a polyolefin, comprising the step of polymerizing olefinic monomers in the presence of a supported catalyst for olefin polymerization, the polyolefin having a weight-average molecular weight (Mw) of 150,000 to 250,000 and a density of 0.900 to 0.970 g/cc, and the support catalyst comprising
   a) a support containing a hydroxyl group on a surface thereof at an amount of 0.1 to 10 mmol/g;
   b) a cocatalyst, which is a compound represented by Formula 4; and
   c) a transition metal catalyst compound represented by Formula 1:

$$[Al(R8)\text{-}O]  \quad\quad\quad \text{[Formula 4]}$$

wherein R8s may be the same or different from each other, and each independently a halogen radical; a hydrocarbyl radical having 1 to 20 carbon atoms; or a hydrocarbyl radical having 1 to 20 carbon atoms that is substituted with halogen; and a is an integer of 2 or more; and

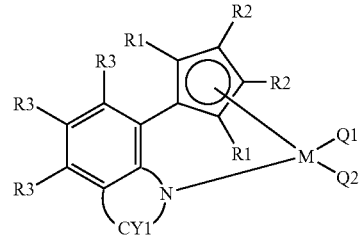

[Formula 1]

wherein R1 and R2 may be the same or different from each other, and each independently hydrogen; an alkyl radical having 1 to 20 carbon atoms; an alkenyl radical having 2 to 20 carbon atoms; an aryl radical having 6 to 20 carbon atoms; a silyl radical; an alkylaryl radical having 7 to 20 carbon atoms; an arylalkyl radical having 7 to 20 carbon atoms; or a metalloid radical of Group 4 metal substituted with hydrocarbyl; wherein R1 and R2, or two R2s may be connected by an alkylidine radical that contains an alkyl radical having 1 to 20 carbon atoms or aryl radical having 6 to 20 carbon atoms to form a ring;

R3s may be the same or different from each other, and each independently hydrogen; a halogen radical; an alkyl radical having 1 to 20 carbon atoms; an aryl radical having 6 to 20 carbon atoms; an alkoxy radical having 1 to 20 carbon atoms; an aryloxy radical having 6 to 20 carbon atoms; or an amido radical; wherein two or more of R3s may be connected to each other to form an aliphatic or aromatic ring;

CY1 is a substituted or unsubstituted, aliphatic or aromatic ring, and CY1 may be substituted with halogen radical; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or an amido radical, in the case where CY1 is substituted with plural substituents, two or more of the substituents may be connected to each other to form an aliphatic or aromatic ring;

M is a transition metal of Group 4; and

Q1 and Q2 may be the same or different from each other, and each independently a halogen radical; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkyl amido radical having 1 to 20 carbon atoms; an aryl amido radical having 6 to 20 carbon atoms; or an alkylidene radical having 1 to 20 carbon atoms.

2. The method for preparing a polyolefin according to claim 1, wherein the transition metal catalyst compound c) is represented by the following Formula 2 or 3:

[Formula 2]

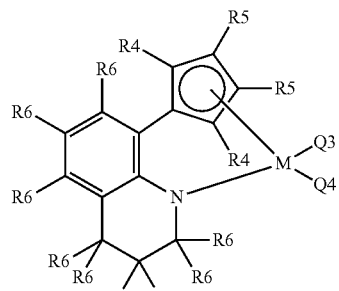

[Formula 3]

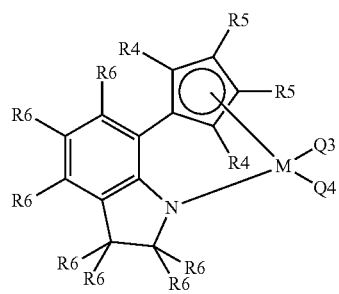

wherein R4 and R5 may be the same or different from each other, and each independently hydrogen; an alkyl radical having 1 to 20 carbon atoms; an aryl radical having 6 to 20 carbon atoms; or a silyl radical;

R6s may be the same or different from each other, and each independently hydrogen; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or an amido radical; wherein two or more of R6s may be connected to each other to form a aliphatic or aromatic ring;

Q3 and Q4 may be the same or different from each other, and each independently a halogen radical; an alkyl radical having 1 to 20 carbon atoms; an alkyl amido radical having 1 to 20 carbon atoms; or an aryl amido radical having 6 to 20 carbon atoms; and M is a transition metal of Group 4.

3. The method for preparing a polyolefin according to claim 1, wherein the transition metal catalyst compound c) is represented by any one of the following structures:

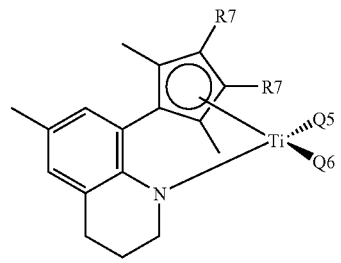

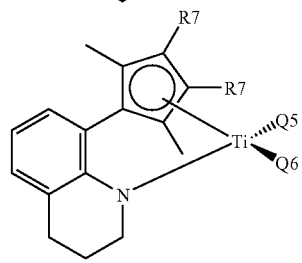

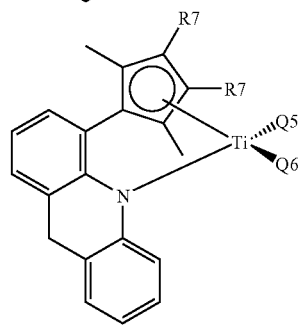

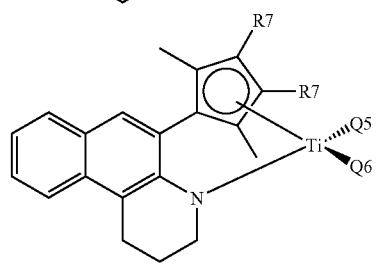

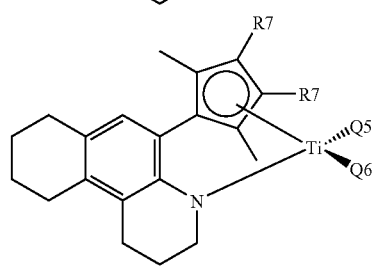

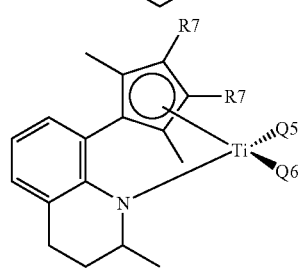

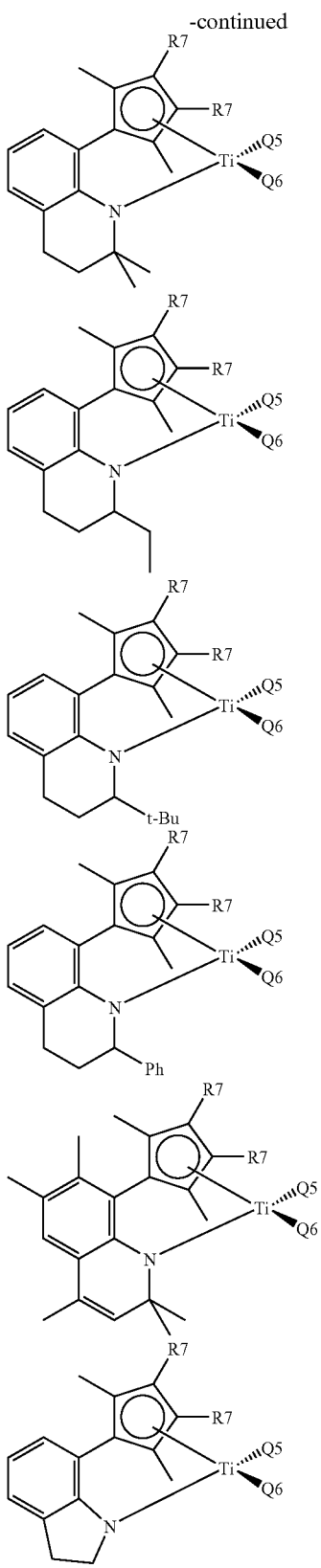

wherein R7s may be the same or different from each other, and each independently selected from hydrogen and a methyl radical, and Q5 and Q6 may be the same or different from each other, and each independently selected from a methyl radical, a dimethylamido radical, and a chloride radical.

4. The method for preparing a polyolefin according to claim 1, wherein the support a) is dried at 200 to 800° C., and contains a hydroxyl group and siloxane group on the surface.

5. The method for preparing a polyolefin according to claim 1, wherein the support a) is selected from the group consisting of silica, silica-alumina, and silica-magnesia.

6. The method for preparing a polyolefin according to claim 1, wherein a ratio of [transition metal]/[support] in the supported catalyst for olefin polymerization is 1 to 30 mol of transition metal per g of support.

7. The method for preparing a polyolefin according to claim 1, wherein the cocatalyst b) is a metal compound containing a Group 13 metal of the Periodic Table.

8. The method for preparing a polyolefin according to claim 7, wherein a weight ratio of [Group 13 metal]/[support] in the supported catalyst for olefin polymerization is 0.01 to 0.4.

9. The method for preparing a polyolefin according to claim 7, wherein a molar ratio of [Group 13 metal]/[transition metal] in the supported catalyst for olefin polymerization is 1 to 10,000.

10. The method for preparing a polyolefin according to claim 1, wherein the supported catalyst for olefin polymerization is pre-polymerized by contacting with the olefinic monomer.

11. The method for preparing a polyolefin according to claim 1, wherein the olefinic monomer is selected from the group consisting of ethylene, alpha-olefin, cyclic olefin, diene olefin, and triene olefin.

12. The method for preparing a polyolefin according to claim 11, wherein the olefinic monomer is selected from the group consisting of ethylene, propylene, 1-butene, 1-pentene, 4-methyl-l-pentene, 1-hexene, 1-heptene, 1-octene, 1-decene, 1-undecene, 1-dodecene, 1-tetradecene, 1-hexadecene, 1-eicocene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, di- vinylbenzene, and 3-chloromethylstyrene.

13. The method for preparing a polyolefin according to claim 1, wherein the polymerization is performed in a slurry or a gas phase process.

14. The method for preparing a polyolefin according to claim 1, wherein the supported catalyst for olefin polymerization is added to the olefinic monomer in the form of slurry prepared by being diluted in at least one solvent selected from the group consisting of C5-12 aliphatic hydrocarbon solvent, aromatic hydrocarbon solvent and hydrocarbon solvent substituted with chlorine.

15. The method for preparing a polyolefin according to claim 1, wherein the molecular weight distribution of polyolefin is in the ranges of 2.3 to 3.0.

16. The method for preparing a polyolefin according to claim 1, wherein the polyolefin has a melt index (MI) of 0.01-100.

* * * * *

UNITED STATES PATENT AND TRADEMARK OFFICE
CERTIFICATE OF CORRECTION

PATENT NO. : 7,915,360 B2  
APPLICATION NO. : 12/312823  
DATED : March 29, 2011  
INVENTOR(S) : Dae-Sik Hong et al.

Page 1 of 1

It is certified that error appears in the above-identified patent and that said Letters Patent is hereby corrected as shown below:

On the Title Page from:

(86) PCT No.: PCT/KR2007/005727  
§ 371 (c)(1),  
(2), (4) Date: May 28, 2007 to:

Item --(86) PCT No.: PCT/KR2007/005727  
§ 371 (c)(1),  
(2), (4) Date: May 28, 2009--

Signed and Sealed this  
Seventeenth Day of May, 2011

David J. Kappos  
*Director of the United States Patent and Trademark Office*